J. G. NORTHCUTT AND M. CRAWFORD.
AGRICULTURAL MACHINE.
APPLICATION FILED JULY 2, 1920.
1,398,198.
Patented Nov. 22, 1921.
2 SHEETS—SHEET 1.
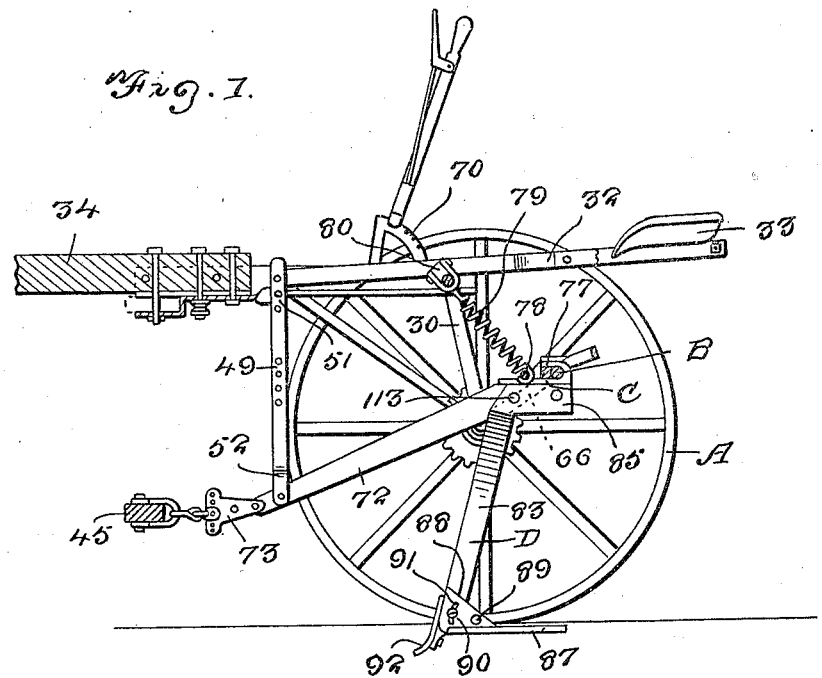
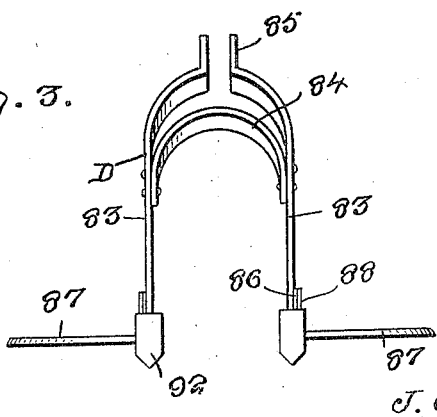

J. G. NORTHCUTT AND M. CRAWFORD.
AGRICULTURAL MACHINE.
APPLICATION FILED JULY 2, 1920.

1,398,198.

Patented Nov. 22, 1921.
2 SHEETS—SHEET 2.

J. G. Northcutt
Miner Crawford
INVENTOR

BY Victor J. Evans
ATTORNEY

UNITED STATES PATENT OFFICE.

JOHN G. NORTHCUTT AND MINER CRAWFORD, OF SILVERTON, TEXAS.

AGRICULTURAL MACHINE.

1,398,198.   Specification of Letters Patent.   Patented Nov. 22, 1921.

Application filed July 2, 1920. Serial No. 393,594.

*To all whom it may concern:*

Be it known that we, JOHN G. NORTHCUTT and MINER CRAWFORD, citizens of the United States, residing at Silverton, in the county of Briscoe and State of Texas, have invented new and useful Improvements in Agricultural Machines, (Case B,) of which the following is a specification.

This invention relates to agricultural machines for cultivating crops and destroying weeds and the principal object of the invention is to provide a wheeled frame of simple construction and provided with means for adjustably supporting a weed cutting attachment.

Another object of the invention is to so construct this weeder attachment that it will destroy the weeds in the space on each side of the row and at the same time cultivate the space and throw the dirt toward the row.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a side view, with one wheel removed, showing the wheeled frame with the weeder attachment.

Fig. 3 is a front elevation of the weed cutting attachment.

Figure 2:
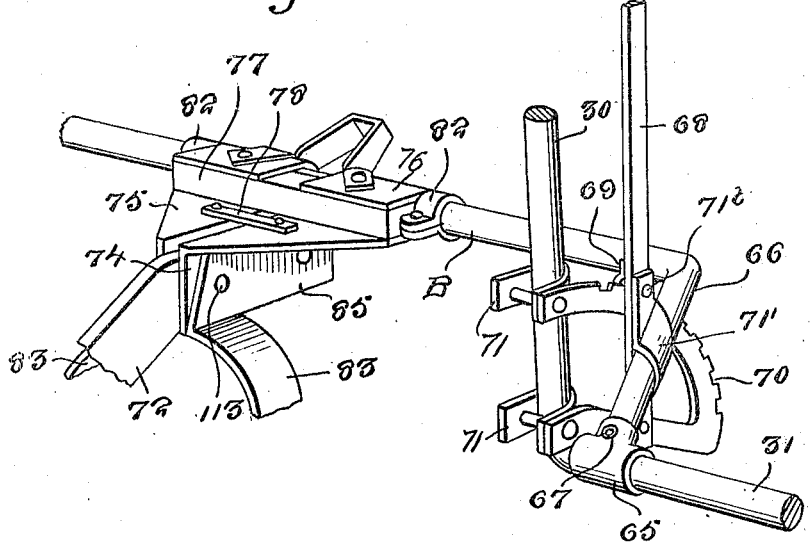
Fig. 2 is a perspective view of the sub-arch of this frame and its attached parts.
Figure 4:
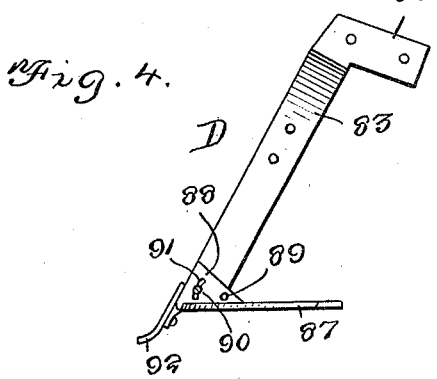
Fig. 4 is a side elevation partly in section of the same.

Referring to the drawings 30 indicates the axle arch having spindles 31 thereon for receiving the wheels A supported thereon for rotation. A frame 32 is attached to this arch, said frame carrying the seat 33 and has attached to its front end the tongue 34. A downwardly depending bar 49 is adjustably connected with the forward part of the frame 32 at its upper end and by means of a pin 51 engaging one of a plurality of holes formed in said bar. The lower end of said bar is bifurcated as at 52.

The spindles 31 are provided with T couplings for the reception of the limbs 66 of the sub-arch B. Cotter keys 67 serve to connect the limbs of the sub-arch with the couplings 65 securely and yet in such a manner as to enable the sub-arch to be detached when desired. The couplings 65 are free to rotate on the spindles, and hence serve to pivotally connect the limbs of the sub-arch to the spindles, thereby providing for the adjustment of the sub-arch about the axis of the spindles. Clamped securely on one limb of the sub-arch is an adjusting lever 68 having a stop member 69 engaging a segment rack 70 which is clamped securely on one limb of the axle arch 30 by means of clips 71. A clip strap 71' is used for the clamping lever and is on the opposite side of the limb of the sub-arch from the lever and is riveted at its upper and lower ends to the lever as shown at 71ᵇ. By means of this lever which turns with the sub-arch the sub-arch may be moved pivotally with respect to the axle arch and retained securely in any position to which it may be adjusted.

To provide for the attachment of various machine elements to the frame, there is provided an implement beam 72 having at its front end a clevis 73 with which the doubletree 45 may be connected when desired, as shown in some of the figures of the drawings. Mounted securely on the side faces of the beam 72 at the rear end thereof are angle plates C having vertical flanges 74 which are secured on the side faces of the beam and lateral flanges 75, said lateral flanges being bent to produce U-shaped keepers 76 engaging the sub-arch B, said keepers serving also to support a bearing block 77 which, together with said keepers, forms a bearing in which the sub-arch may rotate. Secured on the lateral flanges of the angle plates C is a cross bar 78 with which is connected one end of a coiled spring 79, the other end of which is connected with a clip 80 mounted on the axle arch, said spring serving to counterbalance the sub-arch and the parts connected therewith to facilitate the operation of lifting the same when needed.

Clamps or collars 82 are mounted on the sub-arch, one at each side of the angle plates connected with the implement beams to provide for adjustment of the latter longitudinally of the sub-arch and to retain the same in adjusted position. The forward end of the implement beam 72 is pivoted in the fork 52 of the connecting bar 49 whereby the front end of the beam may be secured at various elevations.

The weed exterminator D is composed of a yoke having separate side members 83, said side members being secured upon the limbs of a secondary yoke 84, whereby they are connected together in spaced relation. The side members 83 are provided with rearwardly extending arms 85 adapted to be mounted on the angle plates C by means of the bolts 113. Secured on the outer side faces of the limbs or side members 83 are bearing plates 86 with which knives 87 having upturned bearing plates 88 are connected by pivot members 89, fastening bolts 90 being also provided that operate in arcuate slots 91 in the plates 88 to permit the knives to be slanted to various inclinations. Cultivator teeth 92 are mounted on the lower ends of the side members 83 to facilitate the entrance of the knives into the ground and the subsequent operation thereof, the function of said knives being to cut beneath the surface of the ground to effect the elimination of weeds by cutting the roots of the same. The cultivator teeth 92 also act to throw the dirt toward the row of plants.

It will thus be seen that the weeder attachment is adjustably mounted on the wheeled frame so that it may be made to enter the ground at any desired depth. The device is to straddle the row of plants with a knife and cultivator teeth on each side of the row.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

In a machine of the class described, a wheel carrying frame including an arch axle having wheel carrying spindles and a sub-arch connected with the spindles of the axle for swinging movement about the axis of the spindles, an implement beam having a bearing at its rear end pivotally engaging the sub-arch, an adjustable connection between the front end of said beam and a part of the frame, means for adjusting the sub-arch and for securing it in adjusted position and a weeder attachment connected with said implement beam at its point of junction with the sub-arch.

In testimony whereof we affix our signatures.

JOHN G. NORTHCUTT.
M. CRAWFORD.